United States Patent [19]

Wang

[11] E Patent Number: Re. 32,352

[45] Reissued Date of Patent: Feb. 17, 1987

[54] PORTABLE MULTI-FUNCTION MANICURE APPARATUS

[76] Inventor: Cheng C. Wang, Room 3, 11th Fl., 311, Sec. 4, Chung-Hsiao-East Rd., Taipei, Taiwan

[21] Appl. No.: 439,281

[22] Filed: Nov. 4, 1982

Related U.S. Patent Documents

Reissue of:

[64] Patent No.: 4,303,086
Issued: Dec. 1, 1981
Appl. No.: 185,143
Filed: Sep. 8, 1980

[51] Int. Cl.[4] ..... A45D 29/05

[52] U.S. Cl. ..... 132/73.6; 128/44

[58] Field of Search ..... 132/73.6, 75.3, 75.8, 132/76.4, 74.6; 128/49

[56] References Cited

U.S. PATENT DOCUMENTS

| | | | |
|---|---|---|---|
| 766,970 | 8/1904 | Pfanschmidt | 132/73.6 X |
| 928,043 | 7/1909 | Golden | 132/74.6 X |
| 1,988,581 | 1/1935 | Ubelhart et al. | 132/73.6 |
| 3,916,921 | 11/1975 | Pesola | 132/73.6 |

*Primary Examiner*—Gregory E. McNeill

[57] ABSTRACT

An apparatus comprises a casing, an electrical magnet provided within the casing to produce an alternating magnetic field, an oscillating device actuated by the induced alternating magnetic field, a suction and exhaust device connected with the oscillating device, a massage device driven by the oscillating device and a nail file connected with and actuated by the oscillating device. The apparatus can perform selectively any or all of the functions of suction, exhaust, massage, and nail filing at the same time.

9 Claims, 4 Drawing Figures

PORTABLE MULTI-FUNCTION MANICURE APPARATUS

Matter enclosed in heavy brackets [ ] appears in the original patent but forms no part of this reissue specification; matter printed in italics indicates the additions made by reissue.

BACKGROUND OF THE INVENTION

This invention relates to a portable multi-function apparatus which can selectively perform the actions of suction, exhaust, massage and nail filing.

Although, heretofore, many kinds of devices, such as vacuum cleaners, air pumps, exhausters, massage machines and nail filers, have been designed to perform their own separated function, none of them can perform selectively or simultaneously two or more different functions. If one intends to design an apparatus for doing different works, the large volume of the apparatus must discourage him. Furthermore, most known nail filers and air pumps for bicycle tires are operated manually and troubles are caused as result.

SUMMARY OF THE INVENTION

In accordance with the present invention an apparatus comprises a casing having a plurality of through holes therein, means provided in said casing for producing an alternating magnetic field, oscillating means mounted on an inner wall of said casing and actuated by the induced alternating magnetic field, means driven by said oscillating means and communicated with at least two of the through holes of said casing for sucking and exhausting fluid, means mounted movably on said casing and oscillated by said oscillating means for performing the function of massage, a cleaning device communicated with the sucking through holes of said casing, and means connected with and actuated by said oscillating means for filing one's nails.

Accordingly, it is an object of the present invention to provide an apparatus which can perform selectively the functions of suction, exhaust, massage and nail filing.

It is another object of the present invention to provide an apparatus in which a plurality of sucking through holes and exhausting through holes can be connected respectively with a number of known devices for performing different functions.

It is a further object of the present invention to provide an apparatus in which an oscillating means is driven by an induced alternating magnetic field to supply a driving force to other devices provided in the apparatus.

It is still a further object of the present invention to provide an apparatus in which the massage device has a number of replaceable resilient members for massaging different portions of one's body.

It is an additional object of the present invention to provide an apparatus in which the cleaning device has a replaceable filter bag therein and a transparent portion thereon for checking the condition of the filter bag.

Other and further objects of the present invention will become obvious upon an understanding of the illustrative embodiment about to be described or will be indicated in the appending claims, and various advantages not referred to herein will occur to those skilled in the art upon employment of the invention in practice.

DETAILED DESCRIPTION OF THE PREFERRED EMBODIMENT

Figure 1:
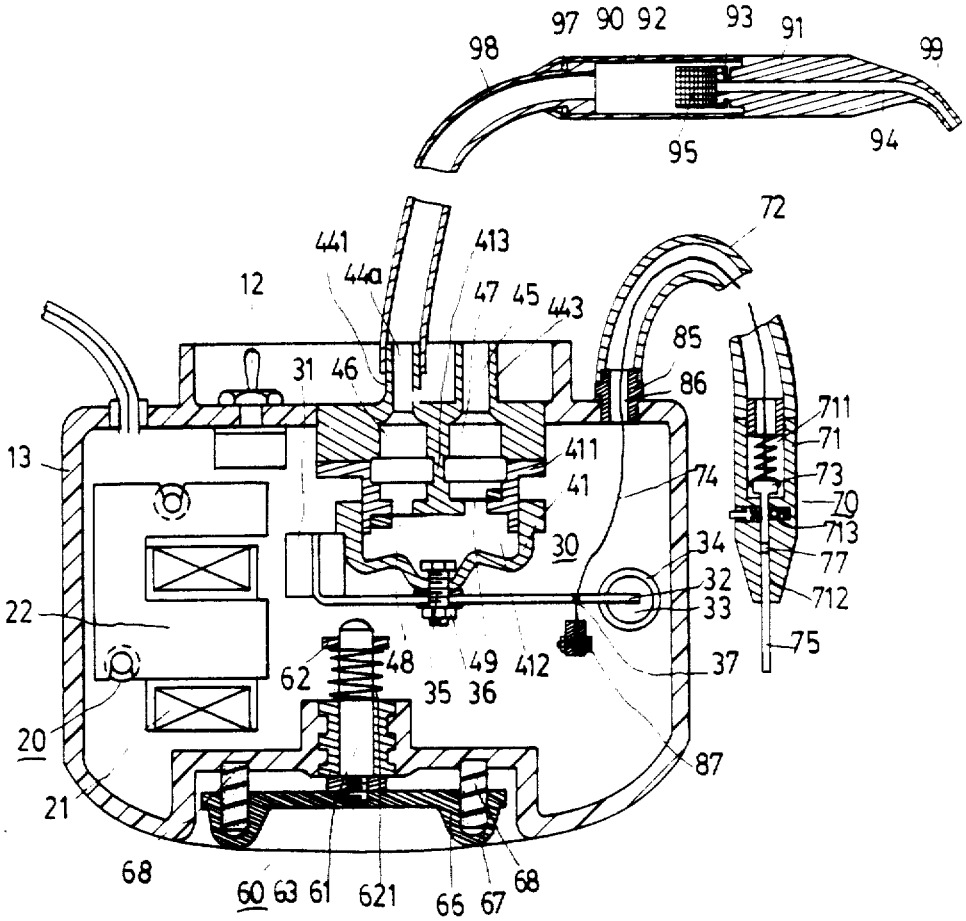
FIG. 1 is a sectional view of an embodiment of the present invention.
Figure 2:
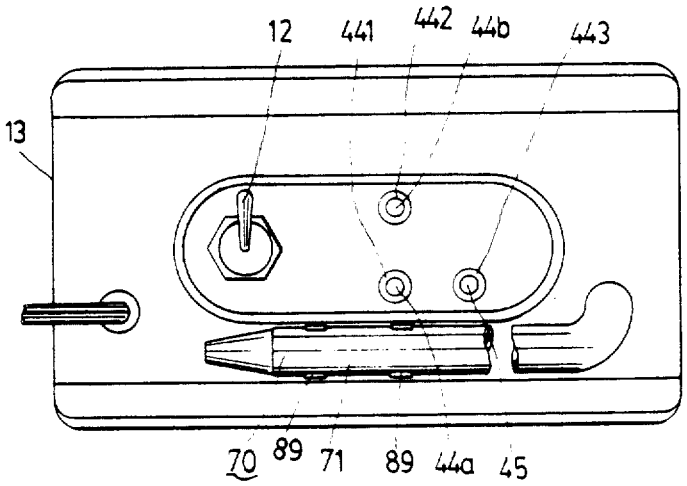
FIG. 2 is a top view of the embodiment shown in FIG. 1.

Referring now to FIGS. 1 and 2, there is shown a preferred embodiment of the present invention which comprises a casing 13, an electrical magnet 20 consisting of a set of coil 21 and a core 22 and an oscillating device 30 consisting of a permanent magnet 31 and a plate spring 32 provided within the casing 13. At one end of the plate spring 32 is provided with the permanent magnet 31 which is adjacent to the electrical magnet 20. And at the other end of the plate spring 32 is provided with a cylindrical stem 33 to be inserted tightly into a hollow cylindrical seat 34 provided on an inner wall of the casing 13 so as to fix one end of the plate spring 32 to the casing 13. An electrical wire 11 connected to an A.C. source is connected with the electrical magnet 20 so that an induction alternating magnetic field will be produced by the electrical magnet 20 corresponding to the frequency of the alternating current, that is to say, the magnetic poles of the core 22 will be exchanged alternately and successively. Thus, the permanent magnet 31 is alternately attracted or released in a single direction by the electrical magnet 20 corresponding to the frequency of the alternating current that makes the plate spring 32 oscillate upwards and downwards.

A flexible diaphragm 41 is mounted on an inward protrusion 411 of the casing 13 to define a chamber 412. By a partition 413 the upper portion of the chamber 412 is divided into two parts 46, 47. There are three through holes 44a, 44b and 45 provided in the casing 13. Two of the through holes communicate with one of the parts 46, 47, and the other through hole 45 communicates with the other part 47. Each of the through holes 44a, 44b and 45 is provided with an outward protrusion 441, 442 and 443 for connecting with a hose or the like. Provided respectively on the lower portion of the two parts 46, 47 are suckion valve 48 and an exhaust valve 49. By screwing a threaded bolt 35 with a nut 36, the lowest portion of the flexible diaphragm 41 is connected to the middle part of the plate spring 32. Consequently, the flexible diaphragm 41 will be compressed and expanded alternately by the oscillation of the plate spring 32 to perform intermittently suction and exhaustion. In other words, when the flexible diaphragm 41 is compressed by the plate spring 32, the air stored within the lower portion of the chamber 412 will flow through the exhaust valve 49 and be exhausted out of the outward protrusion 443 of the through way 45. When the flexible diaphragm 41 is expanded by the plate spring 32, a certain amount of air in the atmosphere wil flow through the through ways 44a, 44b and the suction valve 48 into the lower portion of the chamber 412. Thus, the two suction through ways 44a, 44b are suitable for connecting with a hose of various articles such as a known woman breast increaser, or a known vacuum cleaner or a special cleaner 90 which will be described in detail to hereinafter. The exhaust through way 45 is suitable for connecting with a hose of a known air pump for filling a tire with air, or the like.

Figure 3:
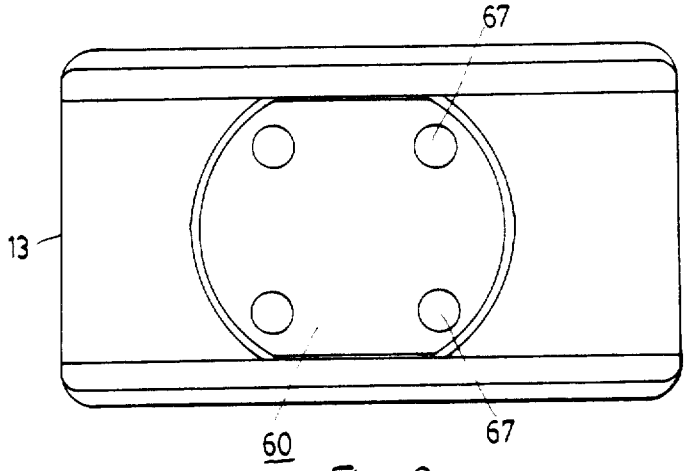
FIG. 3 is a bottom view of the embodiment shown in FIG. 1.

Referring to FIGS. 1 and 3, a massage device 60 is provided on the lower portion of the casing 13. This massage device 60 comprises a movable axle 61 screwed with a nut 62 at the upper end thereof, an axle sleeve 63 extruding through and build in the lower portion of the casing 13 to receive the axle 61 so as to allow a threaded lower end of the axle 61 extruding out of the casing 13, a spring 621 provided between the top surface of the axle sleeve 63 and the nut 62, and a replaceable resilient member 60 made preferably of rubber and mounted on the threaded lower end of the movable axle 61.

The resilient member 66 has four curved protrusions 67 acting as massage heads. Provided respectively between the rear side of the curved protrusions and the lower side of the casing 13 are four resilient sponges 68 for departing the resilient member 66 from the casing 13 by a desirable distance. The upper end of the movable axle 61 is provided under and kept a suitable distance from the oscillating end of the plate spring 32 so that the former is not oscillated by the latter when the massage device is not in use. When one's body touches and presses the massage heads 67 to make the resilient member 66 with the movable axle 61 move toward the plate spring 32, the massgae device 60 is accordingly operated. That is to say, under such situation the movable axle 61 is reciprocally moved within the sleeve 63 by the pressure of a user's body, the oscillation of the spring 32, and the reversing force of the sponges 68 and of the spring 621.

Figure 4:
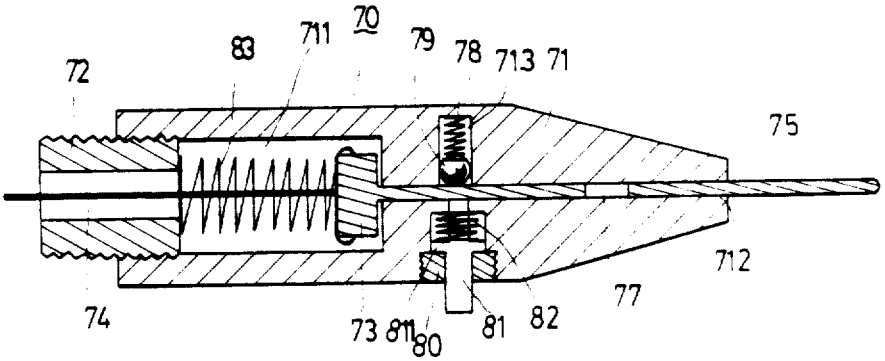
FIG. 4 is a sectional view of the nail filer of the embodiment.

Referring now to FIGS. 1, 2 and 4, a nail filing device 70 includes a body 71 having a chamber 711, a through way 712 communicated with the chamber 711, and a recess 713 extending across the through way 712; a compensating pipe 72 connected to the chamber 711; a filer 75 provided within the through way 712 and having an opening 77 therein and an enlarged end 73 provided in the chamber 711; a locking device consisting of a steel ball 79 and a spring 78 provided in the inner portion of the recess 713; a releasing device consisting of a movable pin member 81 with a flange 811 thereon and a spring 82 both positioned in the recess; a string 74 extruding through the compensating pipe 72 and one end thereof connected to the enlarged end 73 of the filer 75 and the other end thereof connected with the plate spring 32; and a spring 83 placed in the chamber 711 and contacted against the enlarged end 73 of the filer 75.

Specifically speaking, one end of the compensating pipe 72 is connected to a protrusion 85 of a through way 86 provided in the casing 13. Through which one end of the string 74 passes through an opening 37 provided in the plate spring 32 and is fixed on a blocking member 87 whose size is larger than that of the opening 37. Such that if one pulls the string 74 in tight, by the oscillation of the plate spring 32 and the extension force of the spring 83 the file 75 will be alternately moved in an inward and outward direction so as to perform the nail filing actions. When the string 74 is losened the file 75 will keep motionless even the plate spring 32 is still oscillating.

When the filing device 70 is not in use, the filer 75 will be pushed into the through way 712 and the steel ball 79 will be pressed into the opening 77 of the file 75 by the spring 78 so as to fix the filer 75 within the through way 712 of the body 71. Furthermore, the body 71 might be hold firmly on the top surface of the casing 13 by a number of resilient retaining members 89 provided on the casing 13.

The spring 82 is mounted on the flange 811 of the pin member 81 and contacted against an inner wall of the recess 713. To prevent the pin member 81 being moved from the recess 713 a nut 80 is screwed into the recess 713 to contact against the underside of the flange 811. Thus, when one intends to use the nail filing device 70, he may push the pin member 81 inwardly to move the steel ball 79 out of the opening 77 of the filer 75, and then, release the pin member 81 which will return to its original position by the spring 82. Thus, the forward end of the filer 75 will move out of the through way 712 by the compressed spring 83.

A switch 12 is provided on the casing 13 for controlling flowing of the alternating current into the electrical magnet 20 so as to control the oscillation of the plate spring 32.

It is to be understood that the invention is not limited in its application to the details of construction and arrangement of parts as illustrated in the accompanying drawings, since the invention is capable of other embodiments and of being practiced or carried out in various ways. Also it is to be understood that the phraselogy or terminology employed herein is for the purpose of description and not of limitation.

What is claimed is:

1. A multi-function apparatus which comprises:

a casing having a plurality of through holes; means provided in said casing for producing an alternating magnetic field;

oscillating means mounted on an inner wall of said casing and actuated by the induced alternating magnet field;

means driven by said oscillating means and [communicated] *communicating* with at least two of the through holes of said casing for sucking and exhausting fluid; *and* means mounted movably on said casing and oscillated by said oscillating means for performing the function of massage[;

a cleaning device communicated with the suction through hole of said casing for performing the function of cleaning by operation of said suction and exhaust means; and means connected with and actuated by said oscillating means for filing one's nails].

2. An apparatus as claimed in claim 1 wherein said oscillating means comprises a plate spring whose one end is mounted on an inner wall of said casing, and a permanent magnet provided at the other end of the plate spring.

3. An apparatus as claimed in claim [1] *8* wherein said cleaning device has a replaceable dust collecting bag therein and a transparent portion thereon for inspecting of the bag.

4. An apparatus as claimed in claim [2] *7* wherein said nail filing means includes a body, a filer received partially and movably in the body a spring positioned in the body and contacted against the inner end of the filer and a string mounted on the inner end of the file and connected to the plate spring so that when the string is stretched tightly, said filer will be moved reciprocally in an inward and outward direction corresponding to the oscillation of the plate spring, on the other hand, when released the filer will keep motionless in spite of the oscillation of the plate spring.

5. An apparatus as claimed in claim 1 wherein said massage means is normally placed at a position where it will not be oscillated by said oscillating means until it is moved within a certain distance from said oscillating means.

6. An apparatus as claimed in claim 1 wherein said massage means includes a replaceable resilient member.

*7. An apparatus as claimed in claim 1 further comprising means connected with and actuated by said oscillating means for filing one's nails.*

*8. An apparatus as claimed in claim 1 further comprising a cleaning device communicating with the suction*

*through hole of said casing for performing the function of cleaning by operation of said suction and exhaust means.*

*9. An apparatus as claimed in claim 3 wherein said nail filing means includes a body a filer received partially and movably in the body, a spring positioned in the body and contacted against the inner end of the filer and a string mounted on the inner end of the file and connected to the plate spring so that when the string is stretched tightly, said filer will be moved reciprocally in an inward and outward direction corresponding to the oscillation of the plate spring, on the other hand, when released, the filer will keep motionless in spite of the oscillation of the plate spring.*

* * * * *